(12) United States Patent
Owens et al.

(10) Patent No.: US 7,804,767 B1
(45) Date of Patent: Sep. 28, 2010

(54) PROTECTION/RESTORATION OF MPLS NETWORKS

(75) Inventors: Kenneth R. Owens, St. Louis, MO (US); Srinivas V. Makam, Naperville, IL (US); Changcheng Huang, Lisle, IL (US); Vishal Sharma, San Jose, CA (US)

(73) Assignee: Tellabs Operations, Inc., Naperville, IL (US)

( * ) Notice: Subject to any disclaimer, the term of this patent is extended or adjusted under 35 U.S.C. 154(b) by 2345 days.

(21) Appl. No.: 09/696,051

(22) Filed: Oct. 25, 2000

Related U.S. Application Data

(60) Provisional application No. 60/161,277, filed on Oct. 25, 1999, provisional application No. 60/187,798, filed on Mar. 8, 2000.

(51) Int. Cl.
*G01R 31/08* (2006.01)

(52) U.S. Cl. .................. 370/217; 370/221; 370/225; 370/242; 370/465

(58) Field of Classification Search .......... 370/216, 370/217, 218, 219, 220, 221, 222, 223, 224, 370/225, 226, 227, 228, 242, 244
See application file for complete search history.

(56) References Cited

U.S. PATENT DOCUMENTS

| | | | |
|---|---|---|---|
| 4,706,080 A | 11/1987 | Sincoskie | |
| 5,138,615 A | 8/1992 | Lamport et al. | |
| 5,241,534 A * | 8/1993 | Omuro et al. | 370/218 |
| 5,327,427 A | 7/1994 | Sandesara | |
| 5,436,886 A | 7/1995 | McGill | |
| 5,450,578 A | 9/1995 | Mackenthun | |
| 5,771,227 A | 6/1998 | Benayoun et al. | |
| 5,838,924 A | 11/1998 | Anderson et al. | |
| 5,930,259 A | 7/1999 | Katsube et al. | |
| 5,933,412 A | 8/1999 | Choudhury et al. | |
| 5,991,300 A | 11/1999 | Tappan | |
| 6,034,961 A | 3/2000 | Masuo et al. | |
| 6,055,561 A | 4/2000 | Feldman et al. | |
| 6,065,061 A | 5/2000 | Blahut et al. | |
| 6,111,858 A | 8/2000 | Greaves et al. | |
| 6,167,025 A | 12/2000 | Hsing et al. | |
| 6,215,765 B1 | 4/2001 | McAllister et al. | |
| 6,226,260 B1 | 5/2001 | McDysan | |
| 6,339,595 B1 | 1/2002 | Rekhter et al. | |
| 6,452,942 B1 | 9/2002 | Lemieux | |
| 6,463,062 B1 | 10/2002 | Buyukkoc et al. | |

(Continued)

OTHER PUBLICATIONS

Arun Viswanathan, et al., "Evolution of Multiprotocol Label Switching," IEEE Communications Magazine, May 1998.

(Continued)

*Primary Examiner*—Bob A Phunkulh
(74) *Attorney, Agent, or Firm*—Hamilton, Brook, Smith & Reynolds, P.C.

(57) ABSTRACT

In a multi-protocol label system (MPLS) carrying data, a working path carries data from a starting point or node to a destination point or node via a working path. The working path includes the switches and physical media linking starting point and the destination point. MPLS system reliability is enhanced by way of a protection path, over which data can be carried from the starting point to the destination point upon a detected failure along the working path. Upstream messages inform one or more MPLS switching systems to make a switchover from a working path to a protection path.

21 Claims, 11 Drawing Sheets

U.S. PATENT DOCUMENTS

| | | |
|---|---|---|
| 6,504,963 B1 | 1/2003 | Fang et al. |
| 6,530,032 B1 * | 3/2003 | Shew et al. .................... 714/4 |
| 6,532,088 B1 * | 3/2003 | Dantu et al. ................... 398/43 |
| 6,535,481 B1 | 3/2003 | Andersson et al. |
| 6,538,987 B1 | 3/2003 | Cedrone et al. |
| 6,594,268 B1 | 7/2003 | Aukia et al. |
| 6,647,208 B1 | 11/2003 | Kirby |
| 6,680,943 B1 | 1/2004 | Gibson et al. |
| 6,697,329 B1 | 2/2004 | McAllister et al. |
| 6,721,269 B2 * | 4/2004 | Cao et al. ................... 370/227 |
| 2002/0181485 A1 | 12/2002 | Cao et al. |

OTHER PUBLICATIONS

Francois Le Faucheur, "IETF Multiprotocol Label Switching (MPLS) Architecture," Cisco Systems, France.

* cited by examiner

Table A    Figure 9

| Protection Mode | Revertive | Non-revertive |
|---|---|---|
| Protection Configuration | Dynamic | Pre-negotiated |
| Protection Activation | Local repair | Global repair |
| Protection Span | Segment | Entire LSP |
| Protection Trigger | Automatic inputs | External commands |
| Protection Options | 1+1 | 1:1, 1:n, n:m |

Figure 10

Table B

| Timer | Symbol | Function |
|---|---|---|
| Protection interval timer | T1 | Controls the maximum duration within which a protection switch must be accomplished, following the detection of a failure. |
| Restoration interval timer | T1' | Controls the maximum duration within which a restoration switch must be accomplished, following the detection of fault-free operation of the working path. |
| Inter FIS packet timer | T2 | Interval at which successive FIS packets are transmitted by a LSR to its upstream neighbor. |
| Max. FIS duration timer | T3 | Max. time for which FIS packets are transmitted by an LSR to is upstream peer. |
| Inter FRS packet timer | T2' | Interval at which successive FRS packets are sent by a LSR to its upstream neighbor. |
| Max. FRS duration timer | T3' | Max. time for which the FRS packets are sent by an LSR to its upstream neighbor. |

Figure 11

Table C

| Timer | Symbol | Function |
|---|---|---|
| Protection dampening timer | T4 | Time interval between receipt of a protection switch trigger and the initiation of the protection switch. |
| Restoration dampening timer | T4' | Time interval between receipt of a restoration switch trigger and the initiation of the restoration switch. |
| Liveness msg. send interval | T5 | Interval at which successive Liveness messages are sent by an LSR to peer LSRs that have a working path (and RNT) through this LSR. |
| Failure Indication Hold-off Timer | T6 | Interval between the detection of a failure at an LSR, and the generation of the first FIS message, to allow time for lower layer protection to take effect. |
| Lost Liveness msg. threshold | K | No. of Liveness messages that can be lost before an LSR will declare LF and generate the FIS. |

PROTECTION/RESTORATION OF MPLS NETWORKS

RELATED APPLICATIONS

This application claims priority under 35 U.S.C. §119(e) to provisional application Ser. Nos. 60/161,277, filed Oct. 25, 1999; and 60/187,798, filed Mar. 8, 2000, the entire writings and contents of which are incorporated by reference.

BACKGROUND OF THE INVENTION

Network routing deployed in the Internet today is focused primarily on connectivity, and typically supports only one class of service, the best effort class. Multi-protocol label switching, on the other hand, by integrating a label-swapping framework with network layer routing allows flexibility in the delivery of new routing services, since it allows new services to be added without changing the basic forwarding mechanism. This enables more sophisticated features such as quality-of-service (QoS) and traffic engineering to be implemented. An important component of providing QoS, however, is the ability to do so reliably and efficiently. Although the current routing algorithms are very robust and survivable, the amount of time they take to recover from a failure can be significant, on the order of several seconds or minutes, causing serious disruption of service in the interim. This is unacceptable to many organizations that aim to provide a highly reliable service, and thus require recovery times on the order of tens of milliseconds.

Since MPLS binds packets to a route (or path) via the labels, and is likely to be the technology of choice in the future IP-based transport network, it is imperative that MPLS be able to provide protection and restoration of traffic. In fact, a protection priority could be used as a differentiating mechanism for premium services that require high reliability. The remainder of this document discusses the protection requirements for MPLS transport, provides a framework for it, and presents the details of a path-based protection mechanism.

Protection of traffic at the MPLS layer (called MPLS protection) is useful for a number of reasons. The most important is its ability to increase network reliability by enabling a faster response to failures than is possible with Layer 3 (or the IP layer) alone. Furthermore, a protection mechanism at the MPLS layer could enable IP traffic to be put directly over WDM optical channels, without an intervening SONET layer, which would facilitate the construction of IP-over-WDM networks. More importantly, protection at the MPLS layer gives the provider the flexibility to choose the granularity at which traffic is protected, and to also choose the specific types of traffic that are protected.

This document assumes the terminology given in, and, in addition, introduces the following new terms.

Failure Indication Signal

A signal that indicates that a failure has been detected at a peer LSR. It consists of a sequence of failure indication packets transmitted by a downstream LSR to an upstream LSR, at time intervals of T2 units, for a maximum of T3 time units. It is relayed by each intermediate LSR to its upstream neighbor, until it reaches an LSR that is setup to perform a protection switch.

Failure Recovery Signal

A signal that indicates that a failure along the path of an LSP has been repaired. It consists of a sequence of recovery indication packets that are transmitted by a downstream LSR to its upstream LSR, at intervals of T2' units, for a maximum of T3' units. Again, like the failure indication signal, it is relayed by each intermediate LSR to its upstream neighbor, until is reaches the LSR that performed the original protection switch.

Liveness Message

A message exchanged periodically between two adjacent LSRs that serves as a link probing mechanism. It provides an integrity check of the forward and the backward directions of the link between the two LSRs as well as a check of neighbor aliveness.

Link Failure

A link failure is defined as the failure of the link probing mechanism, and is indicative of the failure of either the underlying physical link between adjacent LSRs or a neighbor LSR itself. (In case of a bidirectional link implemented as two unidirectional links, it could mean that either one or both unidirectional links are damaged.)

Loss of Signal

A lower layer impairment that occurs when a signal is not detected at an interface. This may be communicated to the MPLS layer by the lower layer.

Loss of Packet

An MPLS layer impairment that is local to the LSR and consists of excessive discarding of packets at an interface, either due to label mismatch or due to TTL errors.

Working or Active LSP

A LSP established to carry traffic from a source LSR to a destination LSR under normal conditions, that is, in the absence of failures. In other words, a working LSP is an LSP that contains streams that require protection.

Working or Active Path

The portion of a working LSP that requires protection. (A working path can be a segment of an LSP (or a segment of a PMTG) or a complete LSP (or PMTG).) The working path is denoted by the sequence of LSRs that it traverses.

Protection Switch LSR

A LSR that is the origin of both the working path and its corresponding protection path. Upon learning of a failure, either via the FIS or via its own detection mechanism, the protection switch LSR switches protected traffic from the working path to the corresponding backup path.

Protection Merge LSR

A LSR that terminates both a working path and its corresponding protection path, and either merges their traffic into a single outgoing LSP, or, if it is itself the destination, passes the traffic on to the higher layer protocols.

Intermediate LSR

A LSR on the working or protection path that is neither a PSL nor a PML.

MPLS Traffic Group

A logical bundling of multiple, working LSPs, each of which is routed identically between a PSL and a PML. Thus, each LSP in a traffic group shares the same redundant routing between the PSL and the PML.

Protected MPLS Traffic Group

An MPLS traffic group that requires protection.

Protected MPLS Traffic Portion

The portion of the traffic on an individual LSP that requires protection. A single LSP may carry different classes of traffic, with different protection requirements. The protected portion of this traffic may be identified by its class, as for example, via the EXP bits in the MPLS shim header or via the priority bit in the ATM header.

Protection or Backup LSP (or Protection or Backup Path)

A LSP established to carry the traffic of a working path (or paths) following a failure on the working path (or on one of the working paths, if more than one) and a subsequent protection switch by the PSL. A protection LSP may protect either a segment of a working LSP (or a segment of a PMTG) or an entire working LSP (or PMTG). A protection path is denoted by the sequence of LSRs that it traverses.

Revertive

A switching option in which streams are automatically switched back from the protection path to the working path upon the restoration of the working path to a fault-free condition.

Non-revertive

A switching option in which streams are not automatically switched back from a protection path to its corresponding working path upon the restoration of the working path to a fault-free condition.

Reverse Notification Tree

A point-to-multipoint tree that is rooted at a PML and follows the exact reverse path of the multipoint-to-point tree formed by merging of working paths (due to label merging). The reverse notification tree allows the FIS to travel along its branches towards the PSLs, which perform the protection switch.

MPLS Protection Domain

The set of LSRs over which a working path and its corresponding protection path are routed. The protection domain is denoted as: (working path, protection path).

FIS: Failure Indication Signal.
FRS: Failure Recovery Signal.
LF: Link Failure.
LOP: Loss of Packets
LOS: Loss of Signal.
MTG: MPLS Traffic Group.
PMTG: Protected MPLS Traffic Group.
PMTP: Protected MPLS Traffic Portion.
RNT: Reverse Notification Tree.

The need for MPLS layer protection and for open standards in protection arises because of the following:
(i) Layer 3 or IP rerouting may be too slow for a core MPLS network that needs to support high reliability/availability.
(ii) Layer 0 (for example, optical layer) or Layer 1 (for example, SONET) mechanisms may be limited to ring topologies and may not include mesh protection.
(iii) Layer 0 or Layer 1 mechanisms may have no visibility into higher layer operations. Thus, while they may provide link protection for example, they cannot easily provide MPLS path protection.
(iv) Establishing interoperability of protection mechanisms between multi-vendor LSRs in core MPLS networks is urgently required to enable the adoption of MPLS as a viable core transport technology.

BRIEF DESCRIPTION OF THE DRAWINGS

FIG. 9 shows a protection mode table.
FIG. 10 shows a timer, symbol, and function table.
FIG. 11 shows a timer, symbol, and function table.

DETAILED DESCRIPTION OF THE PREFERRED EMBODIMENT

Figure 1:
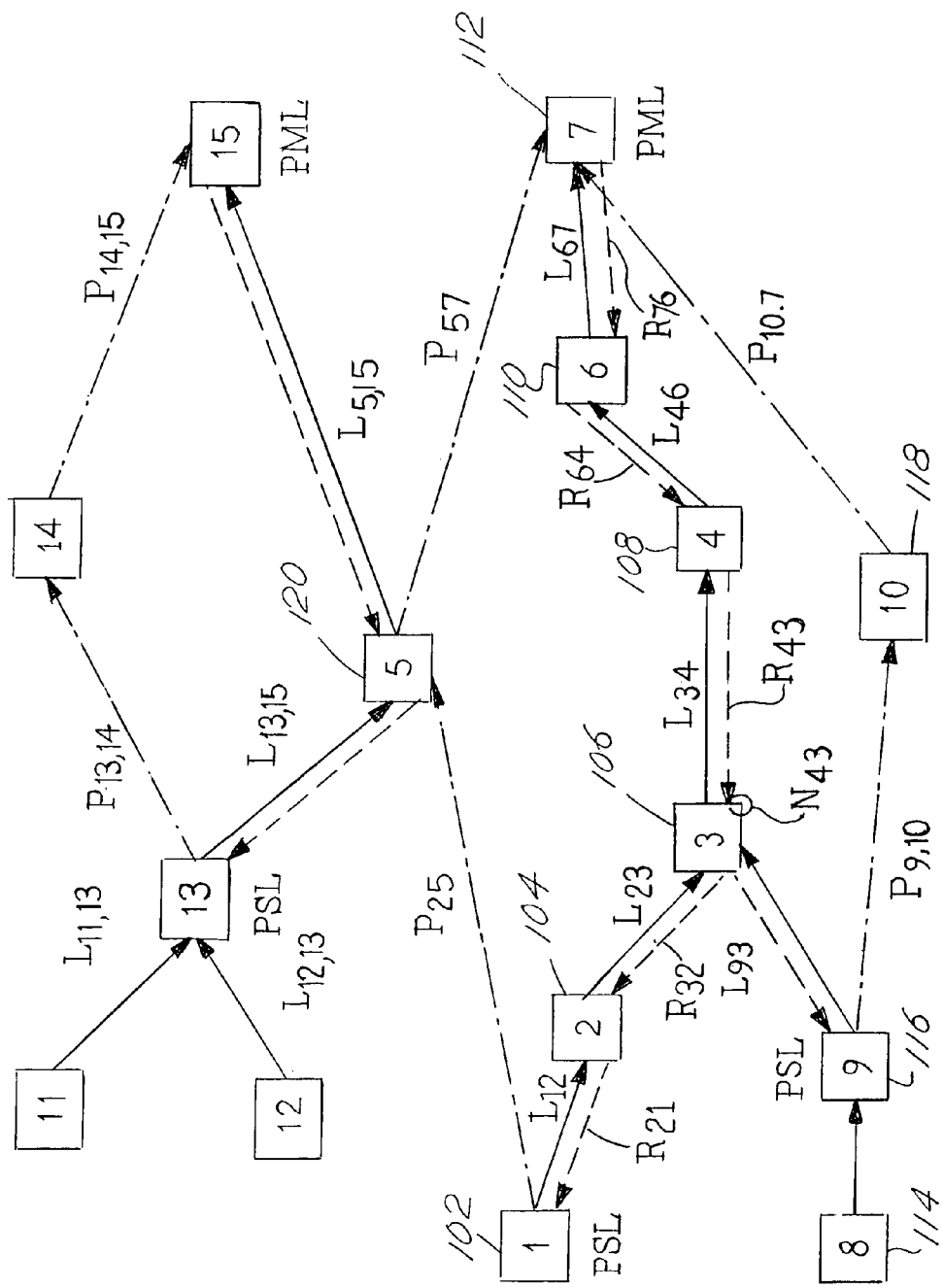
FIG. 1 shows an MPLS network.
Figure 2:
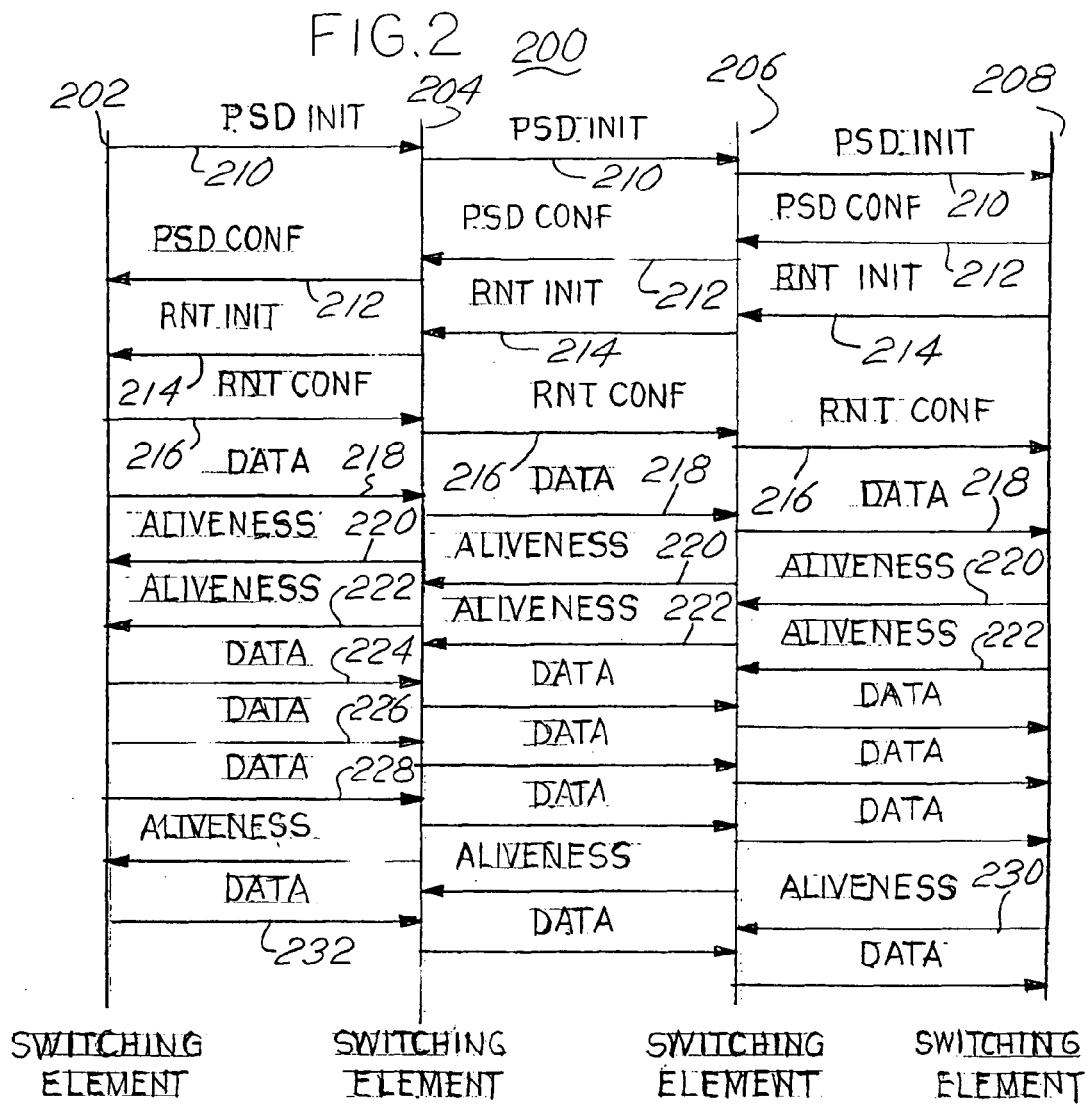
FIG. 2 shows an example information flow between switching elements.

MPLS protection switching refers to the MPLS layer's ability to effect quick and complete restoration of traffic during any changes in the status of the MPLS layer. Fast MPLS layer protection may be viewed as the MPLS LSR switch completion time that is comparable to, or equivalent to, the 60 ms switch completion time of the SONET layer. This section provides a discussion of the concepts and principles of protection switching for MPLS protection. We do not make any assumptions about the underlying layer 1 or layer 2 transport mechanisms or their protection mechanism.

Objectives

We lay down the following objectives for MPLS protection switching.
(i) MPLS protection mechanisms should facilitate fast recovery of the working traffic, to maximize network reliability and availability.
(ii) MPLS protection techniques should be specified for an LSP, PMTP, or PMTG.
(iii) MPLS protection techniques can be specified for traffic on an end-to-end LSP or for a segment of an LSP.
(iv) MPLS protection switching actions should not adversely effect other network operations.
(v) Protection switching actions in one MPLS protection domain should not affect the protection switching actions in other MPLS protection domains.
(vi) If lower layer mechanisms are utilized in conjunction with MPLS layer protection mechanisms, the lower layers should have an opportunity to restore traffic before the MPLS layer does. If lower layer restoration is slower than MPLS layer restoration, the lower layer may communicate failure information to the MPLS layer, and allow it to perform the protection switch.
(vii) Network layer violations should be avoided. That is, MPLS layer defects should not trigger lower layer protection switching.

MPLS protection switching should be designed into the existing protocol to give as much flexibility as possible to the network operator. In fact, the operator should have some alternatives to choose from when deciding what type of protection to implement per MPLS LSP. The most logical way to achieve this would be to use alternatives that are realizable by using the mechanisms currently defined in MPLS. The next few sections outline some of these alternatives.

Protection Configuration

Configuration refers how the protection entities are setup to restore working traffic upon failure. Two possibilities exist.

Dynamic Protection

These protection mechanisms dynamically create protection entities for restoring traffic, based upon failure information, bandwidth allocation and optimized reroute assignment. Thus, upon detecting failure, the LSPs crossing a failed link or LSR are broken at the point of failure and reestablished using signaling (starting either at the source or at the point of failure; see Section 3.3). These methods may increase resource utilization because capacity or bandwidth is not reserved beforehand and because it is available for use by other (possibly lower priority) traffic, when this capacity is not required by the protection path. They may, however, require longer restoration times, since it is difficult to instantaneously switch over to a protection entity, following the detection of a failure. Dynamic protection is for further study, and included here as a placeholder for future enhancements to the protection mechanisms.

Pre-negotiated Protection

These are dedicated protection mechanisms, where for each working path there exists a pre-established protection path, which is node and link disjoint with the primary/working path, but may merge with other working paths that are disjoint with the primary. The resources (bandwidth, buffers, processing) on the backup entity may be either pre-determined and reserved beforehand (and unused), or may be allocated dynamically by displacing lower priority traffic that was allowed to use them in the absence of a failure on the working path.

Protection Activation

Protection activation refers to how the repairs are affected upon the occurrence of a failure on the working path. There are two ways in which this might be done. Global, end-to-end or centralized Repair In end-to-end repair, upon detection of a failure on the primary path, an alternate or backup path is re-established starting at the source. Thus, protection is always activated on an end-to-end basis, irrespective of where along a working path a failure occurs. This method might be slower than the local repair method discussed below, since the failure information has to propagate all the way back to the source before a protection switch is accomplished. It has the advantage, however, of needing only a single PSL per LSP, and, in the case of pre-negotiated protection, requiring the configuration of only a single backup path for each working path, and the reservation of resources along only that path.

Local or Distributed Repair

In local repair, upon detecting a failure on the primary path, an alternate path is re-established starting from the point of failure. Thus protection is activated by each LSR along the path in a distributed fashion on an as-needed basis. While this method has an advantage in terms of the time taken to react to a fault, it introduces the complication that every LSR along a working path may now have to function as a PSL. Furthermore, if pre-negotiated protection is used, this may require the configuration of multiple backup segments, one from each LSR along the path to the PML. If resources along each backup segment are reserved a priori and are kept unused, this could result in considerable inefficiency. One trade-off, therefore, is between speed of reaction to a failure and efficient use of resources. Local repair is for further study, and is not discussed further in this document.

Protection Span

Span refers to the extent of the path or entity that requires protection. The protection path could, in general, span any segment of a working path.

One extreme is link protection, where the intent is to protect against a single link failure. For example, the protection path may be configured to route around certain links deemed to be potentially risky. If static configuration is used, several protection paths may be preconfigured, depending on the specific link failure that each protects against. Alternatively, if dynamic configuration is used, upon the occurrence of a failure on the working path, the protection path is rebuilt such that it detours around the failed link. Link protection is for further study, and is not considered further at this time.

The other extreme is path protection, where the intention is to protect against any link or node failure on the entire working path. This has the advantage of protecting against multiple simultaneous failures on the working path, and possibly being more bandwidth efficient than link protection.

Protection Modes

Protection modes refer to whether or not the traffic is switched back from the protection path to the working path, once the working path is repaired or restored. The two modes of operation here are:

Revertive Mode

In the revertive mode of operation, the traffic is automatically restored to the working path once repairs have been affected, and the PSL(s) are informed that the working path is up. This is useful, since once traffic is switched to the protection path it is, in general, unprotected. Thus, revertive switching ensures that the traffic remains unprotected only for the shortest amount of time. This could have the disadvantage, however, of producing oscillation of traffic in the network, by altering link loads.

Non-revertive Mode

In the non-revertive mode of operation, traffic once switched to the protection path is not automatically restored to the working path, even if the working path is repaired. Thus, some form of administrative intervention is needed to invoke the restoration action. The advantage is that only one protection switch is needed per working path. A disadvantage is that the protection path remains unprotected until administrative action (or manual reconfiguration) is taken to either restore the traffic back to the working path or to configure a backup path for the protection path. In Section 5 it will be seen that using the path protection mechanism that we present, it will be possible to protect the protection path.

Protection Switching Options

Protection switching options refer to the relationship between the active/working paths and backup paths, and define how the working entities are protected by the protection entities.

1+1 Protection

In 1+1 protection, the resources (bandwidth, buffers, processing capacity) on the backup path are fully reserved to carry only working traffic. In MPLS, this bandwidth may be considered "wasted." Alternately, this bandwidth could be used to transmit an exact copy of the working traffic, with a selection between the traffic on the working and protection paths being made at the PML. Since the latter is not the usual mode of operation of MPLS LSRs, we leave 1+1 protection for further study, and focus our attention on 1:1 protection in this document.

1:1, 1:n, and n:m Protection

In 1:1 protection, the resources (bandwidth, buffers, and processing capacity) allocated on the protection path are fully available to preemptable low priority traffic when the protection path is not in use by the working traffic. In other words, in 1:1 protection, the working traffic normally travels only on the working path, and is switched to the protection path only when the working entity is unavailable. Once the protection switch is initiated, all the low priority traffic being carried on the protection path is discarded to free resources for the working traffic. This method affords a way to make efficient use of the backup path, since resources on the protection path are not locked and can be used by other traffic when the backup path is not being used to carry working traffic.

Similarly, in 1:n protection, up to n working paths are protected using only one backup path, while in m:n protection, up to n working paths are protected using up to m backup paths. Since 1:n and n:m protection are more complex that 1:1 protection, we leave them for further study at this time, and we focus on 1:1 protection in the remainder of this document.

Failure Detection

MPLS protection is initiated after the verification of the detection of either lower layer or MPLS layer impairments. We consider three classes of impairments: LOS, LF, and LOP, which were defined in Sections 1.2 and 1.3.

LOS is a lower layer impairment that arises when a signal is not detected at an interface, for example, a SONET LOS. In this case, enough time should be provided for the lower layer to detect LOS and take corrective action. The lower layer recovery does not change the MPLS or Layer 3 routing between LSRs. If it is known that the lower layer's response time is unacceptable, the lower layer could be configured to inform the MPLS layer of the fault, so that the protection action may be initiated at the MPLS layer.

A LF is declared when the link probing mechanism fails. An example of a probing mechanism is the Liveness message that is exchanged periodically along the working path between peer LSRs. A LF is detected when a certain number K of consecutive Liveness messages are either not received from a peer LSR or are received in error. The number K of missing consecutive Liveness messages that cause the declaration of a link failure is a configurable parameter.

A LOP occurs when there is excessive discarding of packets at an LSR interface, either due to label mismatches or due to TTL errors. LOP due to label mismatch may be detected simply by counting the number of packets dropped at an interface because an incoming label did not match any label in the forwarding table. Likewise, LOP due to invalid TTL may be detected by counting the number of packets that were dropped at an interface because the TTL decrements to zero.

Note that MPLS protection is not 100% fault tolerant, since single points of failure can exist. For example, nodes 1 and 9 in FIG. 1. In the case of such failures, it is assumed that routing or administrative action will be necessary to restore the system to a fault-free state.

Failure Notification

Protection switching relies on rapid notification of failures. Once a failure is detected, the node that detected the failure must send out a notification of the failure by transmitting a FIS to those of its upstream LSRs that were sending traffic on the working path that is affected by the failure. This notification is relayed hop-by-hop by each subsequent LSR to its upstream neighbor, until it eventually reaches a PSL. A PSL is the only LSR that can terminate the FIS, and initiate a protection switch of the working traffic to a backup path. Since the FIS is a control message, it should be transmitted with high priority to ensure that it propagates rapidly towards the affected PSL(s). Depending on how failure notification is configured in the LSRs of an MPLS domain, the FIS could be sent either as a Layer 2 or Layer 3 packet. An example of a FIS could be the Liveness message sent by a downstream LSR to its upstream neighbor, with an optional failure notification field set. Alternatively, it could be a separate failure notification packet.

An FIS sent from a downstream node to an upstream node also contains the incoming labels of all LSPs between the two nodes that had protection enabled. (Note that a downstream LSR has this information in its forwarding table, and can easily transmit it in the FIS.) As will be seen in Section 5. This is used by the upstream LSR to identify which of its incoming links to propagate the FIS on.

Protection Switch Trigger

The activation of an MPLS protection switch following the detection of a failure requires a trigger mechanism at the PSL. MPLS protection switching may be initiated due to automatic inputs or external commands. The automatic activation of an MPLS protection switch results from a response to defect or failure conditions detected or received at the PSL. It is possible that the failure detection and trigger mechanisms may be combined, as is the case when a LF, LOP, or LOS failure is detected at a PSL and triggers a protection switch to the backup path. In most cases, however, the detection and trigger mechanisms are distinct, involving the detection of failure at some intermediate LSR followed by the propagation of a failure notification back to the PSL via the FIS, which serves as the protection switch trigger at the PSL. MPLS protection switching in response to external commands results when the operator initiates a protection switch by a command to a PSL (or alternatively by a configuration command to an intermediate LSR, which transmits the FIS towards the PSL).

Note that the LF defect applies to hard failures (fiber cuts, transmitter failures, or LSR fabric failures) as does the LOS failure, with the difference that the LOS is a lower layer impairment that may be communicated to the MPLS layer. The LOP failure, on the other hand, applies to soft failures (excessive errors due to noise on the link, for instance). The LOP results in a declaration of failure only when the percentage of lost packets exceeds a given threshold, which is provisionable and may be set based on the service level agreement(s) in effect between a service provider and a customer.

Protection Switch

The protection switch refers to the actual switching of data from a working path to a backup path, which is caused by the protection switch trigger at a PSL. As explained above, the protection switch trigger may cause the working path to be switched to a pre-configured backup path, or may require the working path to be switched to a backup path that is setup dynamically using signaling. In the case of pre-negotiated protection that we consider in this document, the PSL will protection switch the working path to the backup path at most T4 units after the reception of a FIS or the detection of a failure.

Restoration and Notification

MPLS restoration deals with returning the working traffic from the protection path to the working path. In the revertive mode of operation, the objective is to do this as soon as possible, since the protection path to which the working traffic is switched upon a failure is unprotected, in general. As a result, from a reliability standpoint it is useful to return such traffic to the working path once the working path is restored to a fault-free condition. Once again, restoration is performed by the PSL upon receiving notification, via a FRS, that the working path is active again.

As before, an LSR that detected the failure on the working path also detects the restoration of the working path. If the working path had experienced a LF defect, the LSR detects a return to normal operation via the receipt of a Liveness message from its peer. If the working path had experienced an LOP at an LSR interface, the LSR could detect a return to normal operation via the resumption of error-free packet reception on that interface. Alternatively, a lower layer that no longer detects a LOS defect may inform the MPLS layer at the LSR that the link to its peer LSR is operational. The LSR then transmits a FRS to its upstream LSR(s) that were transmitting traffic on the working path. This is relayed hop-by-hop until it reaches a PSL(s), at which point the PSL switches the working traffic back to the working path.

In the non-revertive mode of operation, the working traffic is not restored to the working path immediately. This is because it might be useful, in some cases, to administratively perform a protection switch back to the working path after gaining further assurances about the integrity of the path, or it may be acceptable to continue operation without the protection path being protected. In the latter case, no further action is required, while in the former case, the LSR either performs the restoration (if it is a PSL), or transmits the FRS back towards the PSL(s) (if it is an intermediate LSR or PML), and the PSL(s) performs the restoration.

We note that if there is a way to transmit failure information back along a protection path towards a PSL, it is possible for the working path and its protection path to exchange roles upon the restoration of the working path following a failure. This is because, in that case, the protection path effectively becomes the working path, and the restored working path functions as a protection path for the original protection path. This is important, since it affords the benefits of non-revertive switch operation outlined in Section 3.6, without leaving the protection path unprotected. In the next section, we outline such a path protection mechanism using the construct of a RNT.

Core MPLS Protection Switching Requirements

The following are the core MPLS protection switching requirements:

(i) MPLS protection SHALL provide a mechanism to identify protection groups (PMTGs) and protection portions (PMTPs).
(ii) MPLS protection MUST provide a mechanism to activate protection.

Thus, each MPLS node SHALL provide two options for enabling protection: Enabled and Not enabled, with Not enabled as the default.

(iii) Each PMTG or PMTP SHALL have a corresponding working and protection path, and SHALL be configured with a PML and PSL. There SHALL be an option for configuring the protection path as either excess or reserved, with excess as the default.

The protection path that is configured as excess SHALL provide lower priority pre-emptable traffic access to the protection bandwidth, while the protection path configured as reserved SHALL not provide any other traffic access to the protection bandwidth.

(iv) Each LSP SHALL provide an option for configuring the protection alternatives as either pre-negotiated or dynamic, with pre-negotiated as the default.
(v) Each LSP SHALL provide a configuration option for enabling restoration as either non-revertive or revertive, with revertive as the default.
(vi) Each LSR SHALL be capable of detecting the following impairments: LF and LOP.
(vii) Each LSR SHALL be capable of handling (generating and processing) the following notification signals: FIS and FRS.
(viii) Each PSL node SHALL perform a protection switch upon the detection of the following impairments or notifications:

LF
LOP
FIS
FRS (ix) Protection switching SHALL be finished within a duration specified by the protection switching interval timer, which should be configurable.

Note: Protection switching times of under 50 ms are desirable.

(x) Each LSR SHALL support manual protection switching commands. This implies that it would be possible under administrative commands to transfer traffic from a working path to a protection path, or to transfer traffic from a protection path to a working path, once the working path becomes operational following a failure.
(xi) A PSL SHALL be capable of performing a switch back to the working path after the failure is corrected.
(xii) MPLS protection SHALL provide a mechanism for failure notification along an RNT as either explicit Layer 2 or explicit Layer 3.

The RNT SHOULD follow the reverse direction of the forward/working path for each PMTP or PMTG.

MPLS Path Protection

This section outlines MPLS protection assuming pre-negotiated, 1:1, path protection with end-to-end protection activation. After discussing the core MPLS path protection components in the next section, we outline the operation of the path protection mechanism, illustrating the actions that the various LSRs along a path must perform.

Core MPLS Path Protection Components

Protection Switch LSR (PSL)

The PSL is the LSR that originates both the working and protection paths, and the LSR that is the termination point of both the FIS and the FRS. Note that the PSL need not be the origin of the working LSP.

Protection Merge LSR (PML)

The PML is the LSR that terminates both the working path and its corresponding protection path. Depending on whether or not the PML is a destination, it may either pass the traffic on to the higher layers or may merge the incoming traffic on to a single outgoing LSR. Thus, the PML need not be the destination of the working LSP.

Intermediate LSR

An LSR that is neither a PSL nor a PML is called an intermediate LSR. The intermediate LSR could be either on the working or the protection path, and could be a merging LSR (without being a PML).

Reverse Notification Tree (RNT)

Since the LSPS are unidirectional entities and protection requires the notification of failures, the failure indication and the failure recovery notification both need to travel along a reverse path of the working path from the point of failure back to the PSL(s). When label merging occurs, the working paths converge to form a multipoint-to-point tree, with the PSLs as the leaves and the PML as the root. The reverse notification tree is a point-multipoint tree rooted at the PML along which the FIS and the FRS travel, and which is an exact mirror image of the converged working paths (see FIG. 1). There are several advantages to choosing that the failure indication and the recovery notification travel along the exact reverse path of the working paths:

The RNT can be established in association with the working path, simply by making each LSR along a working path remember its upstream neighbor (or the collection of upstream neighbors whose working paths converge at the LSR and exit as one). No multicast routing is required.

Only one RNT is required for all the working paths that merge to form the multipoint-to-point forward path. The RNT is rooted at the PML and terminated at the PSLs. All intermediate LSRs on the converged working paths share the same RNT.

The RNT can be implemented either at Layer 3 or at Layer 2. In either case, the delay along the RNT needs to be carefully controlled. This could be ensured by giving higher priority to the failure and recovery notification packets, which travel along the RNT.

Protection Domain

The protection domain consists of the set of LSRs over which the working path and its corresponding protection path are routed. Thus, a protection domain is bounded by the LSRs that provide the switching and merging functions for MPLS protection. These nodes are the PSL and the PML, respectively, both of which are identified during the setting up of an LSP and its corresponding working and protection paths. Protection should ideally be performed between source and destination (end-to-end), but in some cases segment protection may be desired or may be the only option (see FIG. 1). For example, in FIG. 1, the working path 9-3-4-6-7, can only have protection on the segment 9-3-4-6-7.

Note that when multiple LSPs merge into a single LSP, the working paths corresponding to these LSPs also converge. As explained in Section 5.1.4, an RNT is needed in this case for propagating the failure and recovery notification back to the concerned PSL(s). We can therefore have a situation where different protection domains share a common RNT, and it is important to understand the relationship between them.

Relationship Between Protection Domains with Different RNTs

When protection domains have different RNTs, two cases may arise, depending on whether or not any portions of the two domains overlap. If the protection domains do not overlap, the protection domains are independent (note that by virtue of the RNTs in the two domains being different, neither the working paths nor the RNTs in the two domains can overlap). In other words, failures in one domain do not interact with failures in the other domain. For example, the protection domain defined by (9-3-4-6-7, 9-10-7) is completely independent of the domain defined by (13-5-15, 13-14-15). As a result, as long as failures occur in independent domains, the network shown in FIG. 1 can tolerate multiple failures (for example, a failure on the working paths in each domain).

If protection domains with different RNTs overlap, it is still the case that failures on the working paths of the two domains do not affect one another. However, failures on the protection path of one may affect the working path of the other and visa versa. For example, the protection domain defined by (1-2-3-4-6-7, 1-5-7) is not independent of the domain defined by (13-5-7, 13-14-7) since LSR 5 lies on the protection path of the former domain and on the working path of the latter domain.

We note that transferring the working traffic to the protection path is enough to take care of multiple failures on the working path. However, if multiple failures happen such that there is at least one failure on both the working and protection paths, MPLS layer protection will no longer suffice. In this case, the PSL will have to generate an alarm that either initiates Layer 3 routing changes or informs the administrator who may manually reconfigure a different working and protection path.

Relationship Between Protection Domains with the Same RNT

When protection domains have the same RNT, different failures along the working paths may affect both paths differently. As shown in FIG. 1, for example, working paths 1-2-3-4-5-7 and 9-3-4-6-7 share the same RNT. As a result, for a failure on some segment of the working path, both domains will be affected, resulting in a protection switch in both (for example, the segment 3-4-6-7 in FIG. 1). Likewise, for failures on other segments of the working path, only one domain may be affected (for example, failure on segment 2-3 affects only the first working path 1-2-3-4-6-7, where as failure on the segment 9-3 affects only the second working path 9-3-4-6-7).

Timers and Thresholds

For its proper operation MPLS path protection relies on the following timers and thresholds:

| Timer or Threshold | Symbol | Function |
|---|---|---|
| Protection switching interval timer. | T1 | Controls the maximum duration within which a protection switch must be accomplished, following the detection of a failure. |
| Restoration switching interval timer. | T1' | Controls the maximum duration within which a restoration switch must be accomplished, following the detection of fault-free operation of the working path. |
| Inter FIS packet timer | T2 | Interval at which successive FIS packets are transmitted by a LSR to its upstream neighbor. |
| Max. FIS duration timer | T3 | Max. time for which FIS packets are transmitted by an LSR to is upstream peer. |
| Inter FRS packet timer | T2' | Interval at which successive FRS packets are sent by a LSR to its upstream neighbor. |
| Max. FRS duration timer | T3' | Max. time for which the FRS packets are sent by an LSR to its upstream neighbor. |
| Protection switching dampening timer | T4 | Time interval between receipt of a protection switch trigger and the initiation of the protection switch. |
| Restoration dampening timer | T4' | Time interval between receipt of a restoration switch trigger and the initiation of the restoration switch. |
| Liveness msg. send interval | T5 | Interval at which successive Liveness messages are sent by an LSR to peer LSRs that have a working path (and RNT) through this LSR. |
| Failure Indication Hold-off Timer | T6 | Interval between the detection of a failure at an LSR, and the generation of the first FIS message, to allow time for lower layer protection to take effect. |
| Lost Liveness msg. threshold | K | No. of Liveness messages that can be lost before an LSR will declare LF and generate the FIS. |

For proper operation, we require T1 >> T2 > T3, T1' >> T2' > T3', and T1 > T4 and T1' > T4'.

The timers T4/T4' are provisionable parameters that may be configured by the network administrator depending on the length of the working and protection paths and the estimated delay for a packet to traverse these paths. The purpose of these timers is to minimize misordering of packets at a PML following a protection (restoration) switch from the working (backup) to the backup (working) path. This is because packets buffered on the working (backup) path may continue to arrive at the PML even as working traffic begins to arrive on the protection (working) path. Therefore, forcing the PSL to hold off the protection (or restoration) switching action, gives the buffers on the working (protection) path time to clear before data on the protection (working) path begins to arrive.

The timer T6 is used to allow the lower layer protection to take effect before initiating MPLS layer protection mechanisms (for example, an automatic protection switching between fibers that comprise a link between two LSRs). Following the detection of a failure, an LSR waits for T6 time units before issuing the first FIS packet. This allows for the lower layer protection to take effect and for the LSR to learn this through one of several ways: via an indication from a lower layer, or by the resumption of the reception of a Liveness message, or by the lack of LOP.

The threshold K helps to minimize false alarms due to the occasional loss of a Liveness message due to a temporary impairment in a link or a peer LSR. It should be set depending on the intervals T2 and T3. Indeed, if the Liveness message is also used as an FIS, we must have K*T2<T3 (likewise, K*T2'<T3').

Path Protection Operation

In the following sections, we describe the operation of path protection mechanism, explaining the various steps involved with reference to FIG. 1.

Configuration

Protection configuration consists of two aspects: establishing the protection path and creating the reverse notification tree.

Establishing a Protection Path

The establishment of the protection path requires identification of the working path, and hence the protection domain. In most cases, the working path and its corresponding protection path would be specified via administrative configuration, and would be established between the two nodes at the boundaries of the protection domain (the PSL and PML) via explicit (or source) routing using LDP, /RSVP, signaling (alternatively, using manual configuration). The signaling would be used to specify both PMTPs and working paths, where the working paths could span either an entire LSP or a segment of a LSP.

The roles of the various core protection components are:

PSL: The PSL initiates the working LSP and the protection LSP. It is also responsible for storing information about which LSPs or portions thereof have protection enabled, and for maintaining a binding between outgoing labels on the working path and those on the protection path. The latter enables the switchover to the protection path upon the receipt of a protection switch trigger. The PSL also maintains the timers T1, T1', T4, T4', T5, and T6, and the threshold K.

PML: The PML participates in the setting up of a protection path as a merging LSR. Therefore, it learns during signaling (or manual configuration) about which working and protection paths are merged to the same outgoing LSP. It also maintains timers T2, T2', T3, T3', T5, T6, and the threshold K.

Intermediate LSR: An intermediate LSR participates in the setup of the protection path either as a normal LSR or as a merging LSR. It also maintains timers T2, T2', T3, T3', T5, T6, and the threshold K.

Creating the RNT

The RNT is used for propagating the FIS and the FRS, and can be created very easily by a simple extension to the LSP setup process. During the establishment of the working path, the signaling message carries with it the identity (address) of the upstream node that sent it. Each LSR along the path simply remembers the identity of its immediately prior upstream neighbor on each incoming link. The node then creates an "inverse" cross-connect table that for each protected outgoing LSP maintains a list of the incoming LSPs that merge into that outgoing LSP, together with the identity of the upstream node that each incoming LSP comes from. Upon receiving an FIS, an LSR extracts the labels contained in it (which are the labels of the protected LSPs that use the outgoing link that the FIS was received on) consults its inverse cross-connect table to determine the identity of the upstream nodes that the protected LSPs come from, and creates and transmits an FIS to each of them.

The roles of the various core protection components are:

PSL: The PSL must be able to correlate the RNT with the working and protection paths. To this end, it maintains a table with a list of working LSPs protected by an RNT, and the identity of the protection LSPs that each working path is to be switched to in the event of a failure on the working path. It need not maintain an inverse cross-connect table (for the LSPs and working paths for which it is the PSL).

PML: The PML is the root of the RNT, and has to associate each of its upstream nodes with a working path and RNT. It need not maintain an inverse cross-connect table (for the LSPs and working paths for which it is a PML).

Intermediate LSR: An intermediate LSR has to only remember all of its upstream neighbors and associate them with the appropriate working paths and RNTs, and has to maintain an "inverse" cross-connect table.

Failure Detection

Each LSR must be able to detect certain types of failures and propagate an FIS message towards the PSL. Here we consider the failures that could result in the impairments listed in Section 3.8. Specifically, unidirectional link failure, bi-directional (or complete) link failure, and node failure.

Unidirectional Link Failure

A uni-directional link failure implies that only one direction of a bi-directional link has failed.

Downlink Failure

The failure of a link in the downstream direction will be detected by the node downstream of the failed link, either via the LOS being propagated to the MPLS layer by the lower layer or via the absence of Liveness messages. The downstream node will then periodically send out FIS messages to its upstream neighbor (via the uplink), which will propagate these further upstream (using its inverse cross-connect table) until they eventually reach the appropriate PSLs, which will perform the protection switch.

Therefore, in FIG. 1, if the link L34 fails, LSR 4 will detect the failure, and start transmitting an FIS packet once every T2 time units back to LSR 3 over link L43. The traffic in the queues of LSR 4 will continue to be serviced. LSR 3 in turn will propagate the FIS over the RNT back to LSR 2 and LSR 9. The actual protection switch will be performed by LSRs 9 and 1, T4 time units after the receipt of the first FIS. LSR 4 will stop transmitting FIS messages T3 time units after the transmission of the first FIS message.

Uplink Failure

A failure of a link in the upstream direction will be detected by a node upstream of the failed link, either via a LOS being detected at the lower layer and propagated to the MPLS layer (if there was traffic on this reverse link), or via the absence of Liveness messages. The upstream node will then periodically send out FIS messages to the node upstream of it, which in turn will propagate these further until eventually the PSL(s) learns of the failure and performs the protection switch.

Therefore, in FIG. 1, if link L43 fails, LSR 3 will detect the failure, and transmit an FIS to nodes 2 and 9. Node 2, in turn, will transmit an FIS to node 1, and nodes 1 and 9 will perform the actual protection switch Bi-directional link failure or Node Failure When both directions of the link fail (as in the case of a fiber cut), nodes at both ends of the link will detect the failure due to the absence of the Liveness message. Both will transmit FIS messages to their upstream nodes. However, it is only the node upstream of the failed link whose FIS messages will propagate upstream, eventually reaching the appropriate PSLs, which will perform the protection switch to be backup path.

The case of node failure is similar, with the node upstream of the failed node detecting the failure and propagating that information via the FIS message.

For example in FIG. 1, when both directions of the link between nodes 3 and 4 fail (or when node 4 fails), LSR 3 will detect this failure via the non-reception of the Liveness message, and transmit FIS messages to nodes 2 and 9 as before. When nodes 1 and 9 receive the FIS message they will perform the protection switch after waiting for an interval of T4 time units.

The roles of the various core protection components in failure detection are the same. The PSL, PML, and intermediate LSR must all be able to detect LF and LOP, and respond to a lower layer indication of LOS.

Failure Notification

The rapid notification of failure is effected by the propagation of the FIS message along the RNT. Any LSR may generate an FIS, but the PSL is the only LSR that terminates it.

For instance, in FIG. 1 if link L23 fails, LSR 3 will detect it and transmit a FIS to LSR 2, its upstream neighbor along link L23. The FIS will contain the incoming labels (at node 3) of those LSPs on link L23 that have protection enabled. Upon receiving the FIS message, LSR 2 will consult its inverse-cross connect table and generate an FIS message for LSR 1, which on receiving the first FIS packet will wait for time T4 before performing an protection switch.

The roles of the various core protection switching components are:

PSL: The PSL does not generate FIS, but must be able to detect FIS packets.

PML: The PML must be able to generate the FIS packets in response to detecting failure, and should transmit them over the RNT. It begins FIS transmission after timer T6 expires and does so and every T2 time units for a maximum of T3 time units.

Intermediate LSR: An intermediate LSR must be able to generate FIS packets, either as a result of detecting failure or in response to a received FIS packet. It must transmit these to all its affected upstream neighbors as per its inverse cross-connect table. Again, it does so every T2 time units for a maximum of T3 time units. If the intermediate LSR was the one that detected the failure, it waits until the hold-off timer T6 expires before it initiates generation of the FIS.

Protection Switch

Protection switching is the actual switching of the working traffic from the working path to the protection path. This is performed by the PSL, T4 time units after the reception of the first FIS packet.

For example, in FIG. 1, consider protection domain (1-2-3-4-6-7, 1-5-7). When link L34 fails, the PSL LSR 1 on learning of the failure will perform a protection switch of the protected working traffic from the working path 1-2-3-4-6-7 to the backup path 1-5-7. Notice that LSR 7 acts as a protection merge LSR, merging traffic from the active and backup paths. Since buffered packets from LSR 4 may continue to arrive at LSR 7 even after the protection switch (the dampening timer T4 at the PSL tends to mitigate this), a short-term misordering of packets may happen at LSR 7, until the buffers on the working path drain out.

The role of the core protection components is as follows:

PSL: Performs the protection switch upon receipt of the FIS message, and after waiting for time T4 following the first FIS message.

PML: The PML automatically merges protection traffic with working traffic. For a short period of time this is likely to cause misordering of packets, since buffered packets may continue to arrive along the working path.

Intermediate LSR: The intermediate LSR has no action.

Restoration

Restoration is the transfer of working traffic from the protection path to the working path, once the working path is repaired. As outlined in Section 3.6, restoration may be automatic as in revertive protection, or it may be performed by manual intervention (or not performed at all). In the revertive mode, restoration is performed upon the receipt of the FRS message, while in the non-revertive mode it is performed by operator intervention.

The role of the core protection components is similar here to what it is for protection switching. The PML does not do anything, unless it was the node that detected the failure, in which case it transmits a FRS upstream. The intermediate LSR generates the FRS message if it was the node that detected the fault or generates a FRS to relay the restoration status received from a downstream node. The PSL performs the restoration switch T4' seconds after receiving the first FIS message.

Security Considerations

The MPLS protection that is specified herein does not raise any security issues that are not already present in the MPLS architecture.

What is the Motivation for MPLS protection?

Layer 3 or IP rerouting may be too slow for a core network that must support high reliability/availability for premium services.

Layer 0 (optical) or Layer 1 (e.g., SONET) may be limited to ring topologies and may not include mesh protection.

Layer 0 or Layer 1 do not have visibility into higher layer operations.

Layer 0 or Layer 1 may not offer the required granularity of protection.

Interoperable protection mechanisms will facilitate the configuration and management of core MPLS-based networks.

Facilitates construction of IP-over-WDM networks.

Protection Objectives: What Achievements are Desired via MPLS Protection

Maximize network reliability and availability via fast recovery of working traffic.

Avoid network layering violations.

Allow inter-working with lower layer protection.

Avoid adversely affecting other network operations.

Keep switching actions in separate MPLS protection domains independent of each other.

Allow protection to be specified for an LSP, a portion of traffic on an LSP, or a bundle of LSPs.

Allow protection of an end-to-end LSP or a segment of an LSP.

Figure 3:
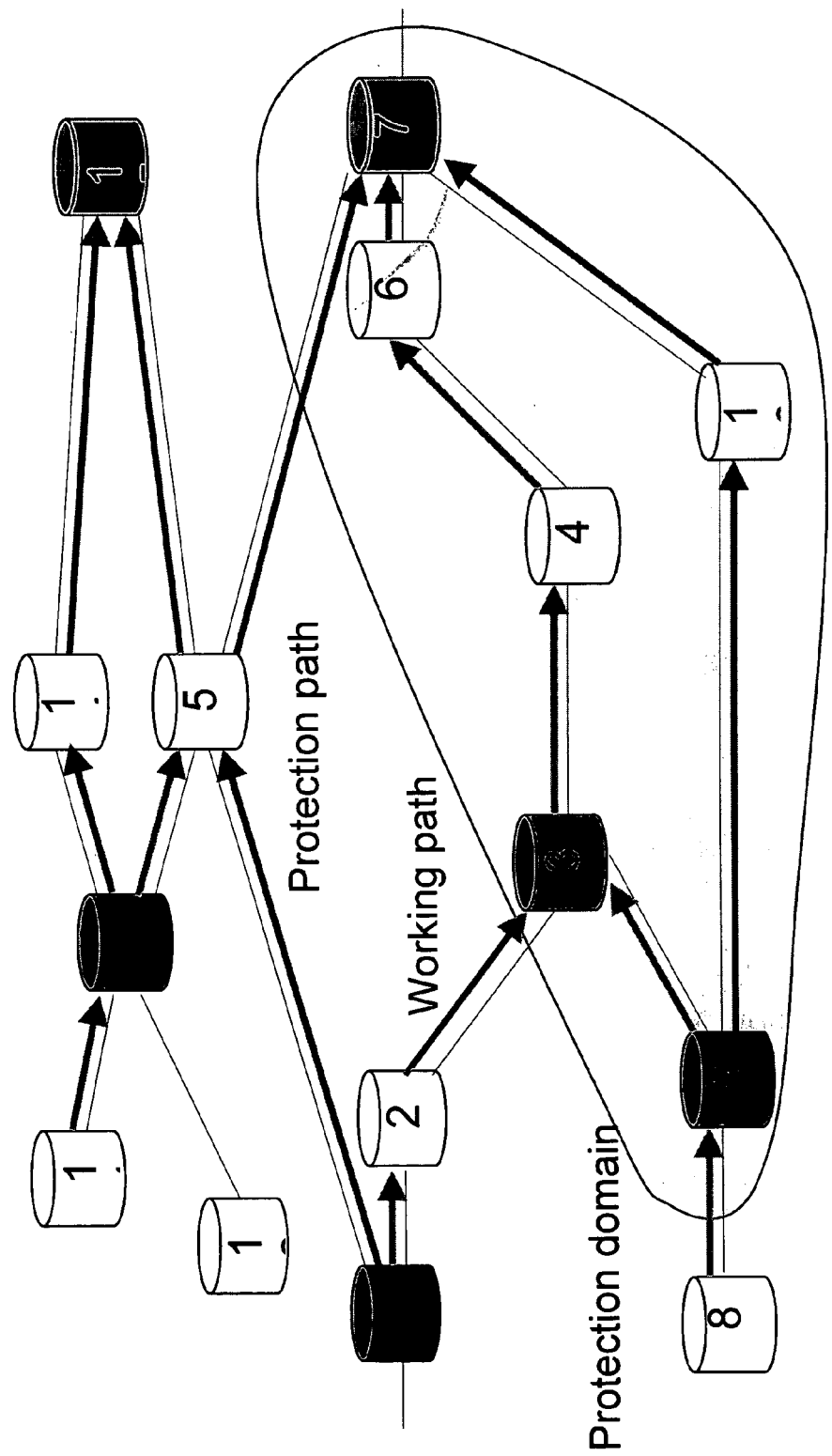
FIG. 3 shows an example MPLS network with a protection domain.

What are the Principles of MPLS Protection?
  See FIG. 3

Figure 4:
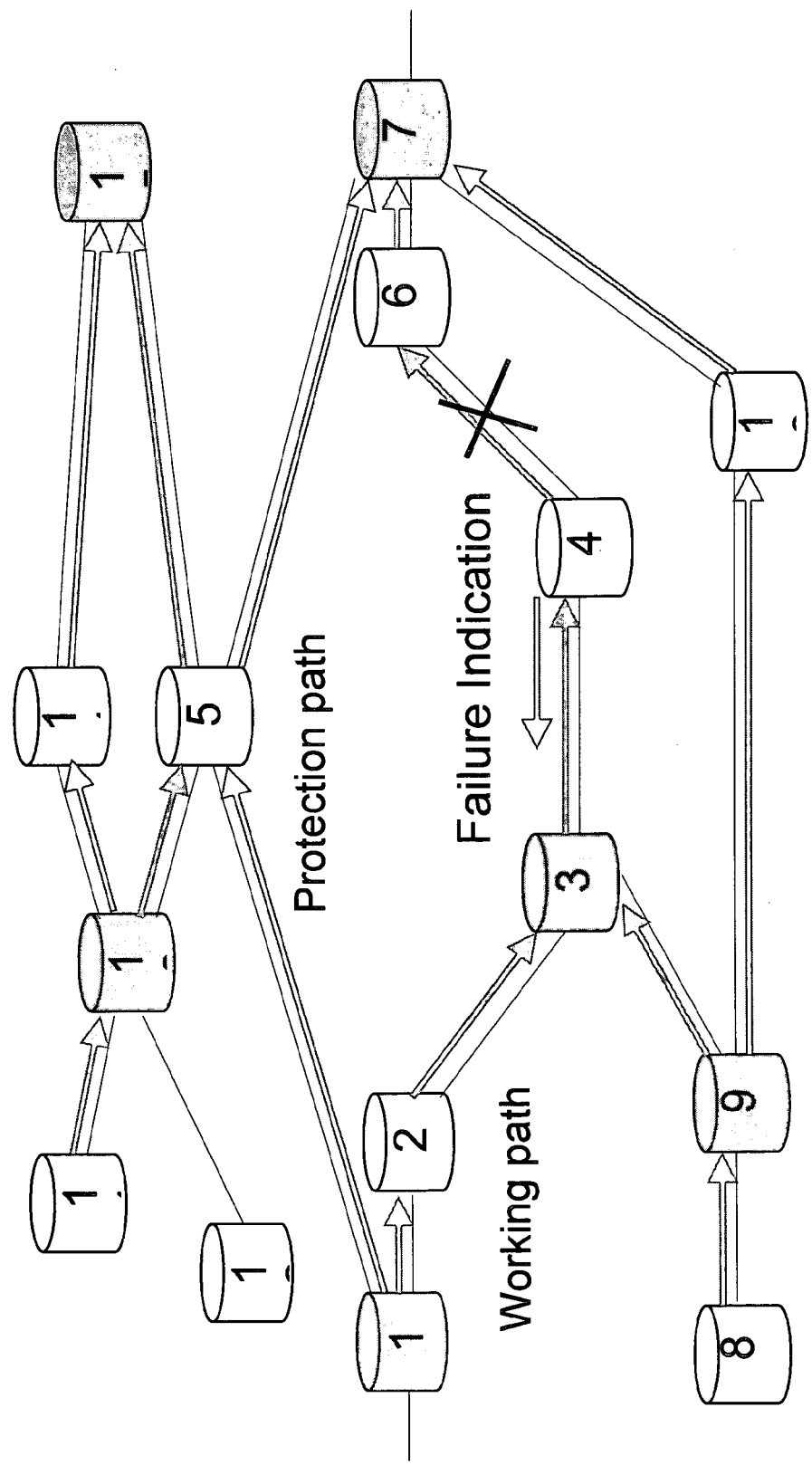
FIG. 4 shows an example MPLS network with a failure indication.

MPLS Protection Principles
  See FIG. 4
  See Table A
  Failure Detection
  Link probing.
  Counting packets in error.
  Failure Notification
  Via Failure Indication Signal (FIS).
  Restoration Notification
  Via Failure Recovery Signal (FRS).
  Basic Requirements for MPLS Protection
  Mechanism to identify protection groups (PMTGs) and protection portions (PMTPs).
  Mechanism to activate protection (enabled/not enabled).
  Option for configuring protection path as either excess or reserved.
  Option for configuring protection alternatives as either pre-negotiated or dynamic.
  Option for enabling restoration (non-revertive/revertive).
  Mechanisms to detect impairments (link probing and counting errored packets).
  Completion within a configurable protection switching interval.

Figure 5:
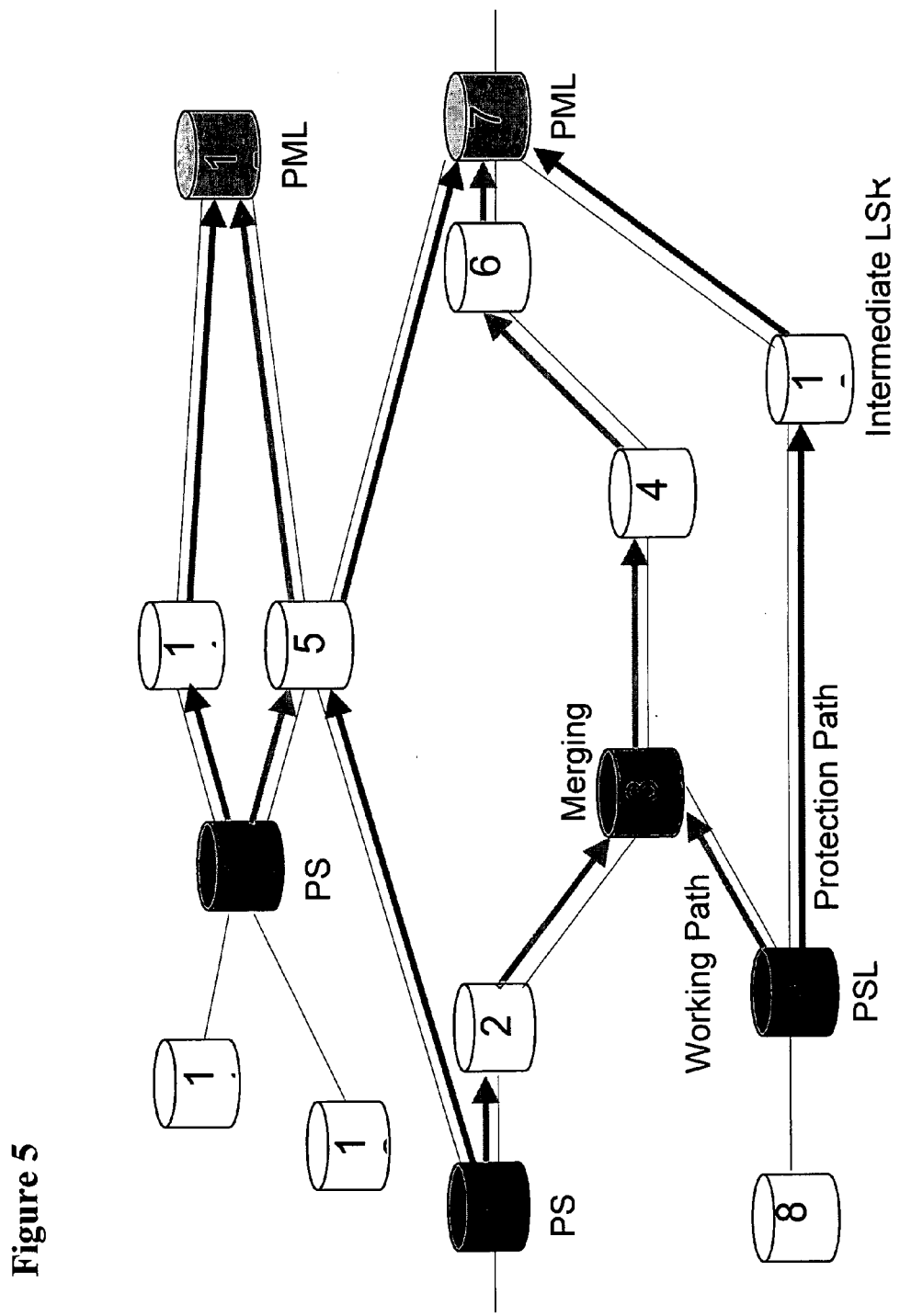
FIG. 5 shows an example MPLS network with working and protection paths.

MPLS Path Protection: Components and Operation
  See FIG. 5

MPLS Path Protection Components: Elements
  Path Switch LSR
  Originates working and protection paths
  Terminates FIS and FRS
  Need not be the origin of the working LSP
  Path Merge LSR
  Terminates working and protection paths
  Need not be the destination of the working LSP
  Can originate FIS and FRS
  Intermediate LSR
  Neither a PSL nor a PML
  Either on the working or on the protection path
  Can be a merging LSR
  Can originate FIS and FRS MPLS Path Protection Components: Timers
  See Tables B and C RNT Path Protection: Structures
  Reverse Notification Tree (RNT)
  Point-to-multipoint tree rooted at PML and terminated at PSLs.
  Exact mirror image of merged working paths.
  FIS and FRS travel along RNT from the point of occurrence of failure.
  No multicast routing is required.
  Only one RNT required for all the working paths that merge to form multipoint-to-point forward path.
  All intermediate LSRs share the same RNT.
  RNT can be implemented either at Layer 3 or Layer 2.
  Delay along RNT should be controlled for FIS and FRS.

RNT Path Protection: Structures
  Inverse Cross-Connect Table
  Maintains list of incoming LSPs merging into each outgoing LSP.
  Keeps identity of upstream node that each incoming LSP comes from.
  Maintains binding between an outgoing label and the incoming labels that map into it.

Figure 6:
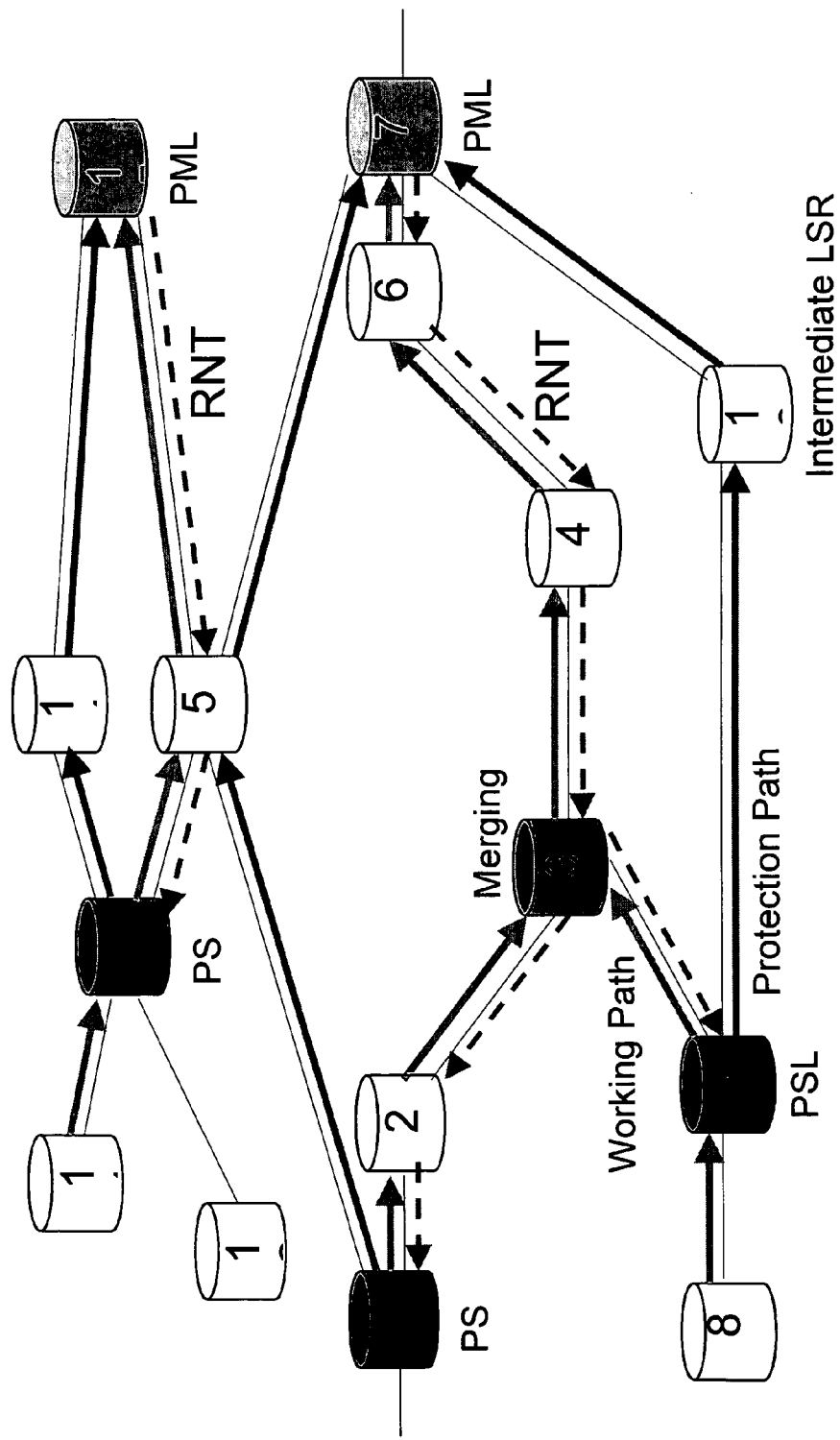
FIG. 6 shows an example MPLS network with a reverse notification tree.
Figure 7:
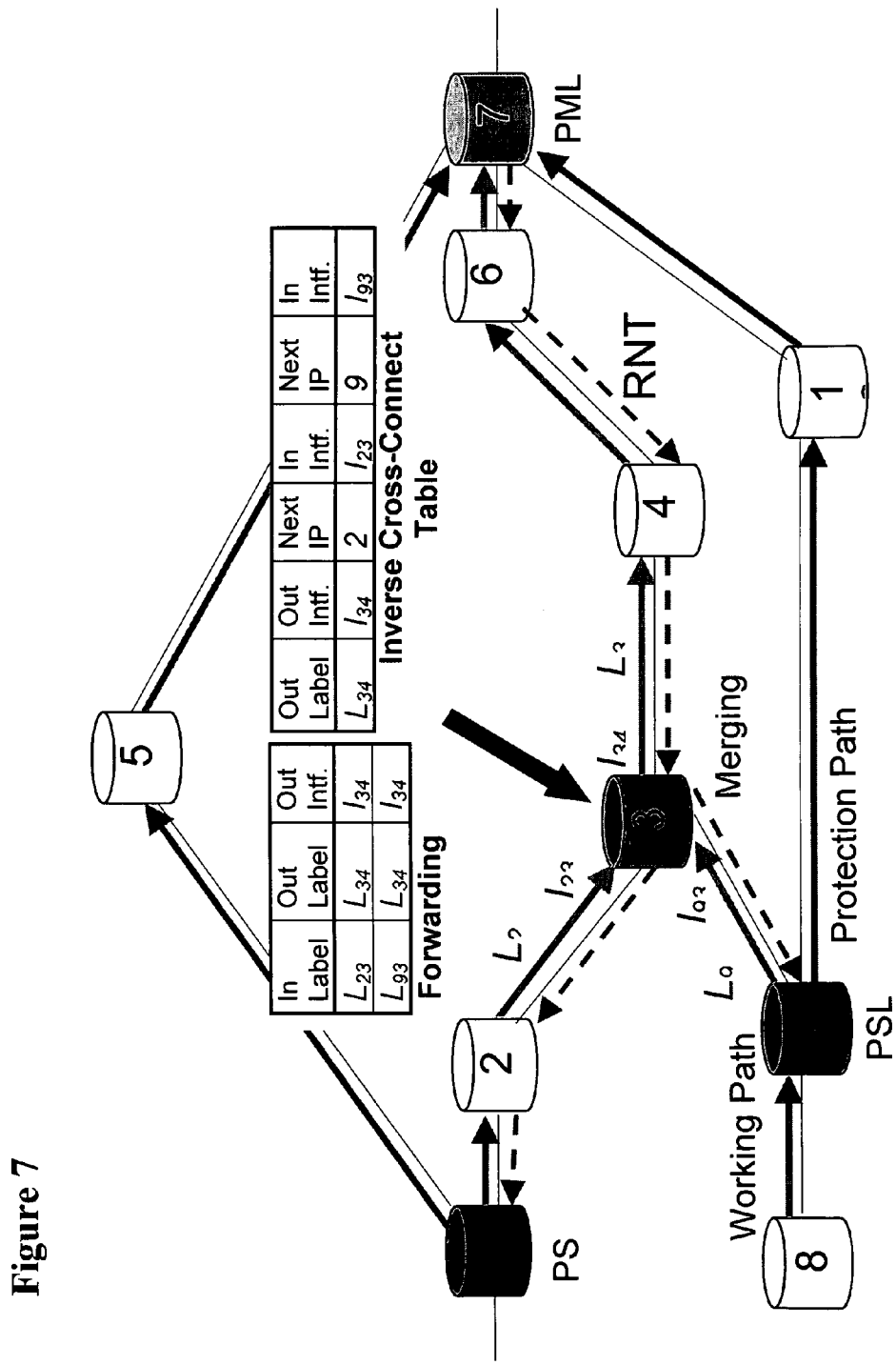
FIG. 7 shows an example MPLS network with forwarding and inverse cross-connect tables.
Figure 8:
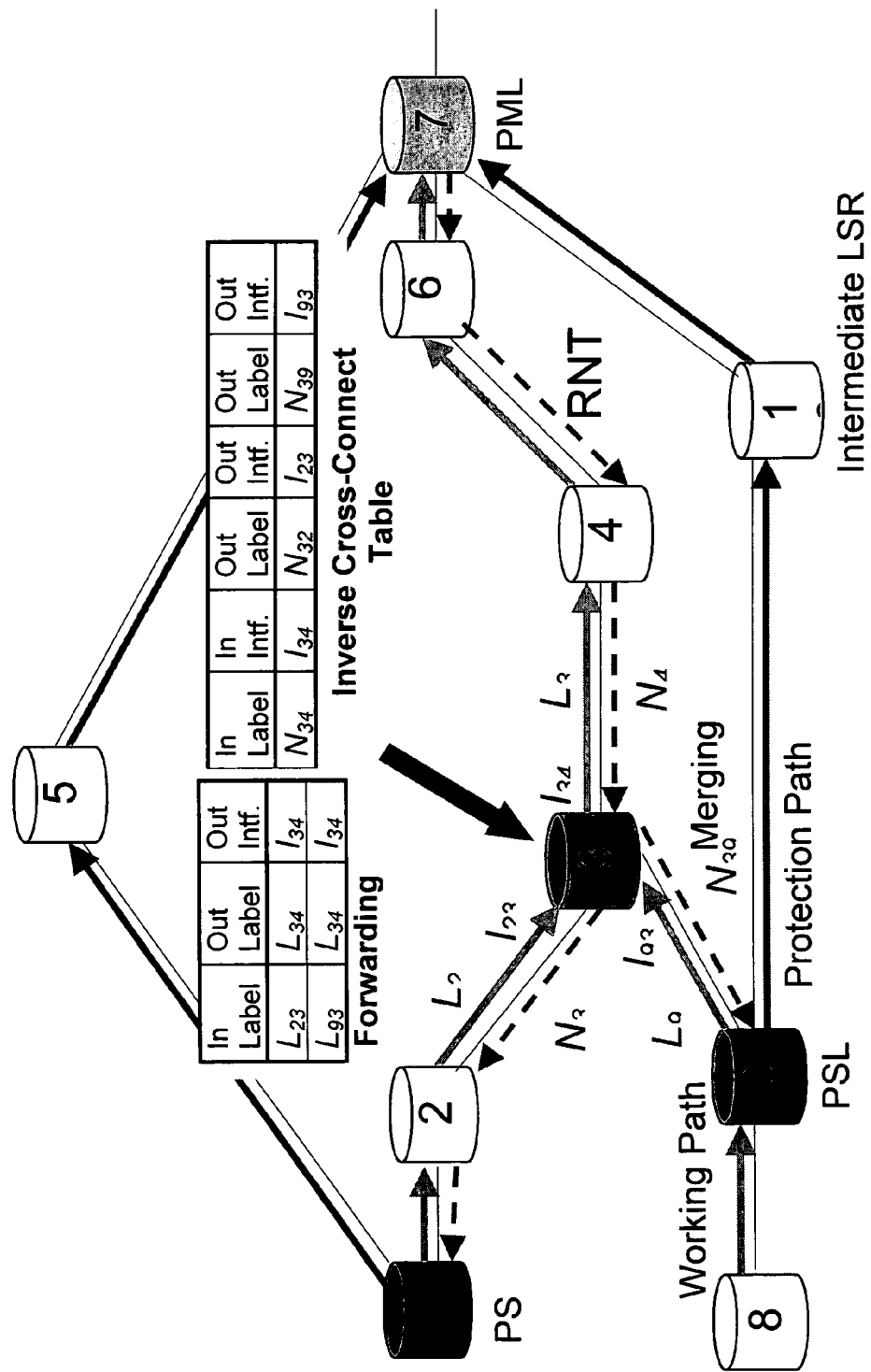
FIG. 8 shows an example MPLS network with forwarding and inverse cross-connect tables.

RNT Path Protection: Components and Operation
  See FIGS. 6, 7, and 8

RNT Path Protection: Operation
  1. Configuration
    Establish working path and protection path.
    Creating the RNT.
  2. Failure Detection: Via
    Liveness message mechanism.
    Counting errored packets.
    Detecting lower layer impairments and co-relating.
  3. Failure Notification
    PSL: detects FIS from downstream LSR.
    PML: can generate FIS if failure is detected.
    Intermediate LSR: detects failure and propagates FIS to upstream LSR using RNT.
  4. Protection Switch
    PSL: performs the protection switch.
    PML: merges traffic on working and protection paths.
    Intermediate LSR: no special action needed.
  5. Restoration and Notification
    PSL: performs restoration to working path if revertive mode
    PML: generates and propagates FRS, if involved in failure restoration; merges working traffic with protection traffic.
    Intermediate LSR: generates and propagates FRS, if involved in failure restoration.

Conclusions
  Formalized MPLS protection principles
  Provided a taxonomy for MPLS protection.
  Developed a failure detection and notification framework.
  Proposed requirements for MPLS protection/restoration
  Maintain relative layer independence.
  Allow pre-configured or dynamic protection options.
  Allow for 1:1 and 1:n protection with bandwidth sharing.
  Proposed a specific mechanism for path protection
  Protects merged LSPs (fits well with MPLS architecture).
  Defined a reverse notification tree (lightweight).
  Defined timers (aid configuration and reliability).

APPENDIX

One objective of the present invention is to provide a high-reliability option for user virtual private networks which use MPLS as the transport protocol. The invention addresses problems associated with configuring the protection paths, failure detection and notification, path protection switching, restoration notification and path restoration. The invention can be used to provide path protection to several nodes without using feedback paths (which consume bandwidth) and using reverse notification tree.

In an embodiment of the invention, a reverse Notification Tree is set up using very simple MPLS signaling during the working path setup itself that can be used to communicate failure information to appropriate sources. This particular scheme does not require any complex multicast tree setup. Uses a simple "inverse" cross-connect table at each node that indicates which upstream nodes connect to paths emanating from the down stream node. Simple Reverse Notification Tree to propagate failure and recovery information to sources. Capability to handle merged MPLS LSPs to provide protection to multiple LSPs simultaneously.

Topics:
  Protection Requirements
  Protection Framework
Protection Mechanisms
  Protection Requirements:
Configuration
  Working Path LSPs that Require Protection Shall Be Identified
  Protection Path LSPs Shall Be Established
  Reverse Notification Tree (Multicast IP, or LSP) Shall Be Established
Failure Detection
  MPLS Nodes Shall Detect Alarm and Keep Alive Failures
Failure Propagation
  MPLS Nodes Shall Send Failure Notification Message Over the Reverse Path Upon Detection of Working Path Failure
  MPLS Nodes Shall Send Failure Restoration Message Over the Reverse Path Upon Detection of Working Path Restoration
Protection Switching
  MPLS Protection Switch Shall Occur 1 Second After Failure Detection Restoration
  MPLS Restoration Shall Occur 1 Second After Restoration Detected Protection Framework:

Identify working path flows
  Protection Enabled
  Pre-negotiated or Dynamic
  Label Merging Nodes or Not
  Revertive or Non-revertive
Establish Protection Path
  Designate Protection Switch LSR (PSL) and Protection Merge LSR (PML)
  L2 or L3 Option
  Excess, Protection, or Reserved Bandwidth
Establish Reverse Path
  Designate PML Root Node
  RNT Used for Sending FIS Messages to PSL
Failure Detection
  Link Failure (LF) and Loss of Packets Failure(LOP)
Failure Propagation
  The Detector Node Will Forward FIS Over the RNT Continuously For 1 Second
Protection Switching
  PSL Performs Protection Switch Immediately Upon Detection of FIS
Failure Restoration
  The Detector Node will Forward FRS Over the RNT Continuously for 1 Second, or Traffic Restored, Upon Detection of Restoration
  The PSL Could Switch back to the Restored Working Path Immediately or After Synchronizing With the PML Upon Detection of FRS Protection Mechanisms:

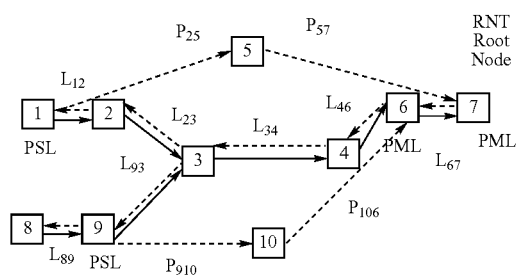

Configuration
  Working Path
  Protection Path
  RNT Multicast LSP

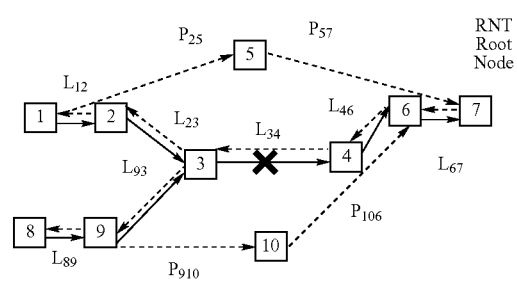

Failure Detection
  $L_{34}$
  RNT
  Node

Failure Propagation

Protection Switch

Restoration

Miscellaneous Issues in MPLS Protection:

For what type of traffic should one initiate protection?
  High Priority
  Real-time/Delay Sensitive
How should resources be allocated on a backup path?
  Use Preemption to Displace Best Effort Traffic on Alternate Paths to Accommodate Protection Traffic
  Allocate a Portion of Resources Given to Primary Path to a Backup Path
Who should be switched to protection path upon failure?
  Use Prioritization and Ranking Between LSPs ps Is MPLS Link Layer Protection Desired?
  Use Lower Layer (SONET)

The invention claimed is:
1. A multi-protocol label switching (MPLS) system protection switch comprising:
  a first data input port into which MPLS data is received from a data source;
  a first data output port from which MPLS data is sent to a second MPLS switching system comprising an MPLS working path;

a second data output port from which MPLS data is sent to a third MPLS switching system comprising an MPLS protection path; and a second data input port adapted to connect to a path that follows the MPLS working path for receiving a failure notification associated with a failure;

whereby data received at the data input port from the data source can be selectively routed from the second MPLS switching system to the third MPLS switching system by a node at an origin of both the MPLS working path and the MPLS protection path and upstream to the failure.

2. The MPLS switching system of claim 1 further comprising a control input port where protection path failure messages are received from at least one of the second MPLS switching system and the third MPLS switching system.

3. A multi-protocol label switching (MPLS) system comprising:
   a first MPLS protection switch having a data input port into which MPLS data is received from a data source;
   a second MPLS switching system coupled to the first MPLS protection switch via a first data path carrying MPLS data, the first data path comprising an MPLS working path;
   a third MPLS switching system coupled to the first MPLS protection switch via a second data path capable of carrying MPLS data, the second data path comprising an MPLS protection path;
   an upstream reverse notification tree (RNT) data path that follows the MPLS working path and extends at least between the second MPLS switching system to the first MPLS protection switch, that upon a failure can carry a failure notification by which in response to the failure a switchover from the MPLS working path to the MPLS protection path, by a node at an origin of the MPLS working path and the MPLS protection path, can be initiated.

4. A method for MPLS protection switching from a MPLS working path to a MPLS protection path comprising:
   transmitting a failure notification associated with a failure to a protection switch node along a path that follows the MPLS working path; and
   routing data at the protection switch node from the MPLS working path to the MPLS protection path upon receipt of the failure notification, wherein the protection switch node is at an origin of the MPLS working path and the MPLS protection path and the protection switch node is upstream to the failure.

5. The method of claim 4, wherein the failure notification is transmitted in a direction reverse to the MPLS working path.

6. The method of claim 4, wherein the path that follows the MPLS working path mirrors the MPLS working path.

7. The method of claim 4, further comprising detecting a failure.

8. The method of claim 4, wherein the failure notification is transmitted by a node upstream to the failure.

9. The method of Claim 4, wherein the failure is an uplink failure and is detected by a node upstream to the failure.

10. The method of claim 4, wherein the failure is a downlink failure and is detected by a node downlink to the failure.

11. The method of claim 4, wherein the failure is a bi-directional failure and is detected by a pair of nodes downlink and uplink to the failure.

12. The method of claim 4, wherein the failure is a node failure and is detected by a pair of nodes downlink and uplink to the failure.

13. An apparatus for MPLS protection switching from a MPLS working path to a MPLS protection path comprising:
   a failure notification relay mechanism adapted to transmit a failure notification along at least one segment of a path that follows the MPLS working path, upon a failure along the MPLS working path; and
   a protection switch adapted to switch traffic from the MPLS working path to the MPLS protection path upon receiving the failure notification, wherein the protection switch is at an origin of the MPLS working and protection paths.

14. The apparatus of claim 13, further comprising a failure detection mechanism adapted to detect the failure and transmit the failure notification along the at least one segment of the path that follows the MPLS working path.

15. The apparatus of claim 14, wherein the failure detection mechanism is at a node upstream to the failure.

16. The apparatus of claim 14, wherein the failure is an uplink failure and the failure detection mechanism is at a node upstream to the failure.

17. The apparatus of claim 14, wherein the failure is a downlink failure and the failure detection mechanism is at a node downlink to the failure.

18. The apparatus of claim 14, wherein the failure is a bi-directional failure and the failure detection mechanism is at a pair of nodes downlink and uplink to the failure.

19. The apparatus of claim 14, wherein the failure is a node failure and the failure detection mechanism is at a pair of nodes downlink and uplink to the failure.

20. The apparatus of claim 13, wherein the failure notification relay mechanism is adapted to allow the transmission of the failure notification in a reverse direction of the MPLS working path.

21. The apparatus of claim 13, wherein the path that follows the MPLS working path mirrors the MPLS working path.

* * * * *